Feb. 12, 1952 J. STRENG 2,585,699

KEYBOARD STRUCTURE

Filed July 6, 1949 2 SHEETS—SHEET 1

INVENTOR
JAN STRENG

BY

John J. Lynch

ATTORNEY.

Feb. 12, 1952 J. STRENG 2,585,699

KEYBOARD STRUCTURE

Filed July 6, 1949 2 SHEETS--SHEET 2

INVENTOR
JAN STRENG

BY

John J. Lynch

ATTORNEY.

UNITED STATES PATENT OFFICE 2,585,699

KEYBOARD STRUCTURE

Jan Streng, Redding, Conn., assignor to Remington Rand Inc., New York, N. Y., a corporation of Delaware Application July 6, 1949, Serial No. 103,215

15 Claims. (Cl. 197—98)

This invention relates generally to the keyboards of business machines, and the like, and it is particularly concerned with a dustproof keyboard structure.

As we know, accumulations of dust and foreign particles, particularly erasure fragments, tend to clog, slow up, and interfere with the moving parts of such machines.

The general object of this invention is to prevent such dust and foreign particles from entering through the keyboard down into the mechanism of the machine.

This general object is accomplished by means of compactly set keys and improvements in the structure of the keys as well as in the related framework, whereby dust and dirt particles are prevented from entering between the keys to the mechanism below.

A more particular object of this invention is a compact, dustproof keyboard structure of block keys, wherein the several keys and the related adjoining framework have complementary arcuate walls, and the arcs of such walls have a radial point concentric with the common pivot of the several key levers.

A further object of this invention is a compact keyboard serving to seal out dust and foreign particles from entering the machine, such compactness being obtainable by keys in arcuate block form having slidable contact with one another and with the related framework.

Another object of the invention is a character key for use in business machines and the like, such key having an elongated block structure with arcuate front and rear walls.

Other objects and advantages of this invention, as well as the structural details thereof, will become apparent as this specification unfolds in greater detail and when it is read in conjunction with the accompanying drawings.

In the several drawings.

In the several drawings similar characters serve to identify similar parts.

Figures 1, 2, 7:
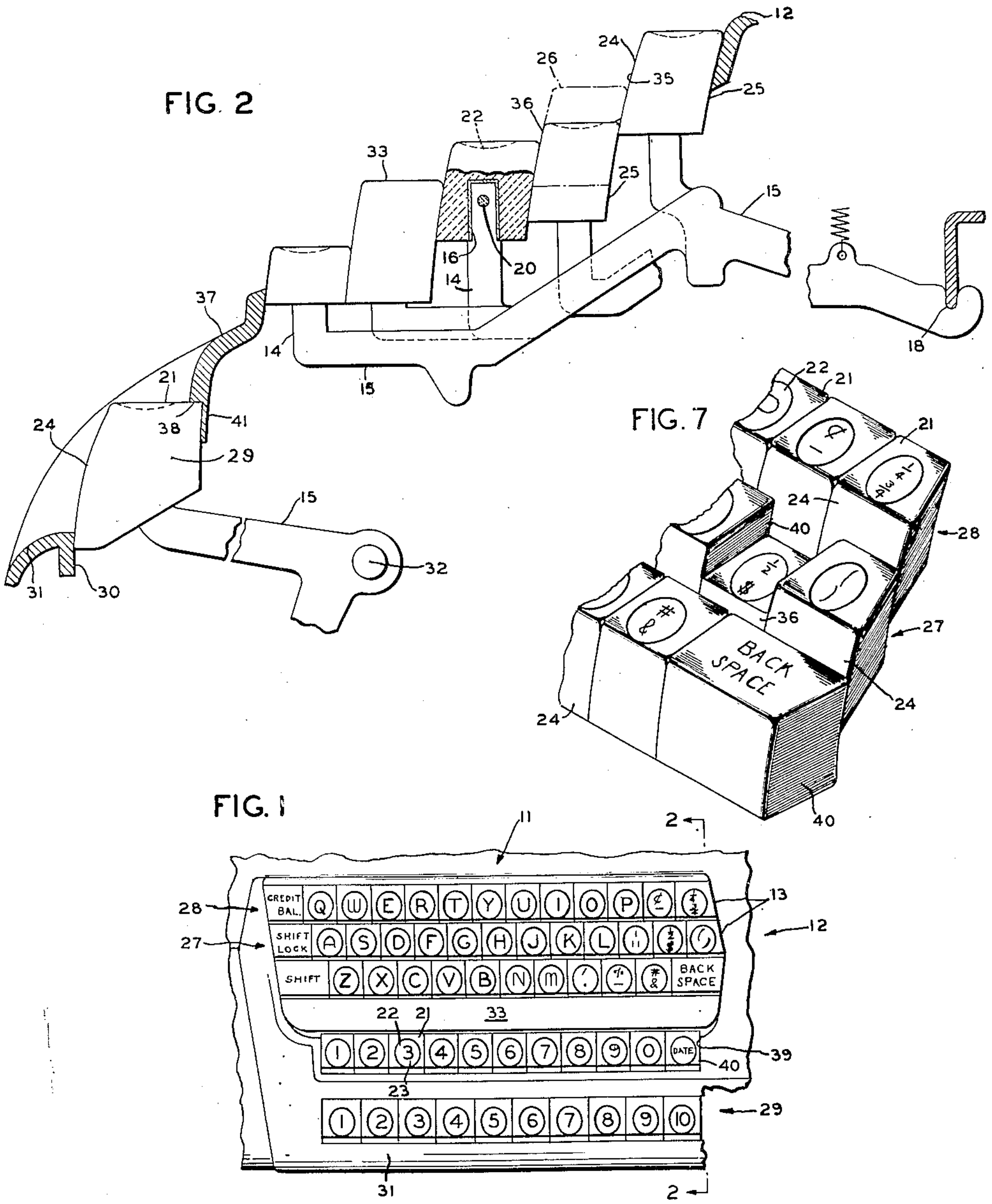
Fig. 1 is a plan view of a keyboard as used in a business machine.
Fig. 2 is an enlarged vertical, longitudinal section taken on the lines 2—2 of Fig. 1.
Fig. 7 is a perspective view of a fragmentary section of Fig. 1.

Referring to the drawings, there is shown a keyboard designated generally 11. About the keyboard is the related framework 12 of the machine. The keyboard comprises several horizontal rows of keys 13 in ascending step formation. The several keys are fast to key stems 14. The key stems 14 project upwards from conventional levers 15 into slots 16 in the bodies 17 of the keys 13. The levers 15 pivot on a transverse shaft 18 which acts as a common pivot for the several key levers. The keys are molded fast to the stems 14 by means of a cold plastic bonding material 19 placed in the slot 16 about the key stems. Some of the plastic enters a hole 20 pierced through the stem 14. Upon hardening of the plastic substance 19 the keys are molded and bonded fast to the key stems. The several keys are provided with deep or vertically elongated bodies 17 in block form. The top surface 21 of each key body 17 is provided with a finger well 22. In this well is stamped a character 23, indicative of the nature of the key.

The several keys 13 and the related framework are in close proximity to one another rendering the keyboard as compact a unit as possible without interfering with the movement of the several keys. In relation to one another the several walls of the keys have a sliding contact movement, as in Figs. 1, 2 and 7. This compactness is achieved by the block form, as well as by the arcuate front and rear wall structure of the several keys. The sliding contact movement of the arcuate walls is enabled by having the radial point of the arcs of the front key walls 24 and the rear key walls 25 concentric to the common pivot 18 of the key levers 15. The hard plastic nature of the keys and their smooth walls further aid in this sliding movement.

The arcs of the front walls are convexed, and those of the rear walls are concaved. The several keys 13 are adapted to swing by their levers 15 on the pivot 18 in an arc when depressed. The front and rear walls of the several keys are curved in conformity with the arc formed by the swing of such levers, as shown by the dotted lines 26. The position of the keys 13 in relation to one another is such that the concaved rear walls 25 of a row of keys in the keyboard, such as in row 27, are opposed or complementary to the convexed walls 24 of the next rearwardly positioned row of keys, such as in row 28.

Where the arcuate walls of a row of keys adjoin the framework 12 the arc of the adjacent framework wall is complementary to that of the opposing key walls, and the radial points of such arcs and key walls are concentric. This relationship of framework and keys is best shown and exemplified in Fig. 2. There we can see the convexed front walls 24 of the numeral keys of the first row of keys 29. Complementary to such convexed key walls is the concaved rear wall 30 of the front frame-piece 31. The radial point 32 of the arc of such concaved rear wall 30 is common to that of the convexed front walls 24 of such row of keys 29.

The side walls 40 of the several keys 13 have a flat surface and their relative position to one another and to the wall of the adjoining side framework 39 is such as to allow a sliding movement of the one as against the other.

The transverse space bar key 33, in the manner of the other keys 13, also has front and rear arcuate walls which are complementary to the arcuate walls of the rows of keys on either side of it.

In the form of the invention shown in Figs. 1, 2 and 7 the several keys are in slidable contact with one another and to the related adjoining framework. The compactness of the keyboard in this form is such that the keyboard acts as a dustproof cover to the mechanism of the machine, sealing out dust and dirt.

Figure 5:
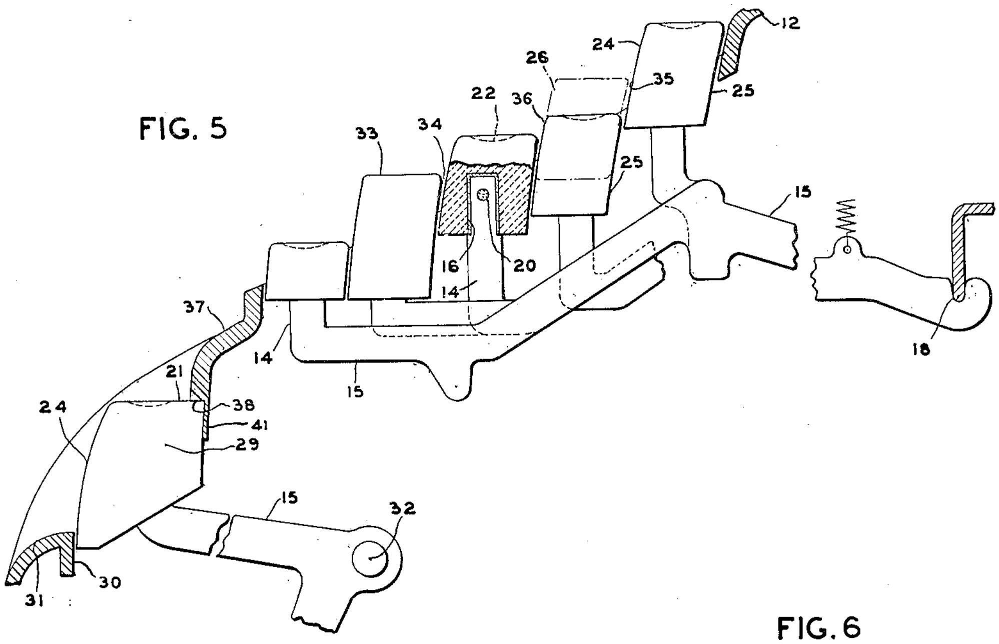
Fig. 5 is an enlarged vertical, longitudinal section taken on lines 5—5 of Fig. 4.
Figure 6:
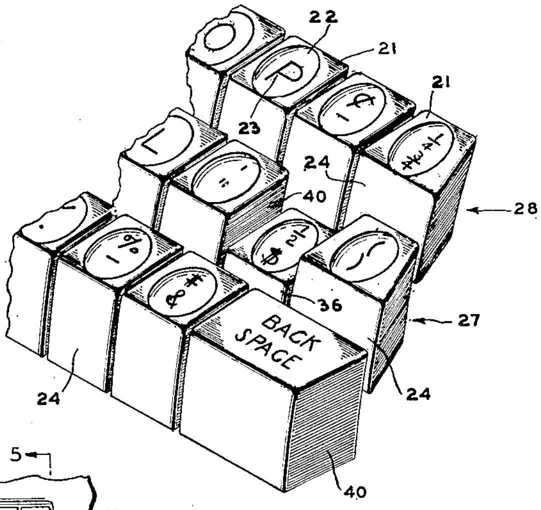
Fig. 6 is a perspective view of a fragmentary section of the keyboard in Fig. 4 with one of the keys in depressed position.
Figure 3:
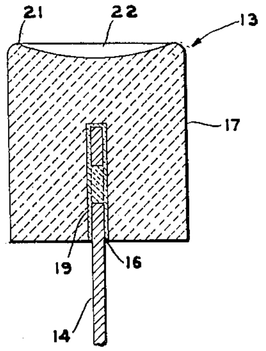
Fig. 3 is a view of a vertical transverse section through the center of one of the keys.
Figure 4:
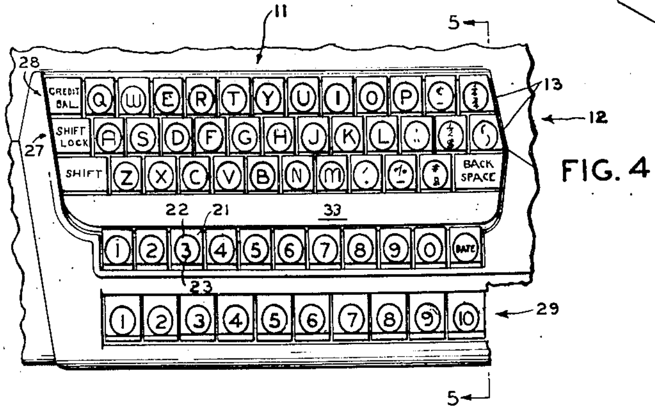
Fig. 4 is a view similar to that of Fig. 1 but with a limited space between the keys.

Figs. 4, 5 and 6 represent a form of the invention differing from that in Figs. 1, 2 and 7 only in that a limited space 34 exists between the walls of the several keys. In this form of the invention such space is limited only to that which will allow movement of the keys without their rubbing against one another. A dustproof keyboard is also obtained where this limited space is allowed. Dust is prevented from entering into the machine not only by such limited space, but also because of the combination of the concaved and convexed walls of the several keys in adjacent complementary position to one another. This complementary relation of the arcuate walls of the keys to one another affords an added obstruction to dust particles, for it can readily be seen that the crests 35 of the convexed key walls, as sheltered by the adjacent concaved key walls will create a block to the entrance of dust and dirt.

Dust is further kept out of the machine by means of the depth of the bodies 17 of the keys 13. The key bodies 17 extend vertically down into the machine, so that the front, side, and rear walls of each key are faced by the walls of the immediately adjacent keys. In the several drawings there are shown by way of example keys 36 in depressed position and their depressed position relative to the adjacent keys. In this construction of the keys with relatively deep bodies no opening is disclosed beneath the bodies of those keys not depressed and, consequently, dust is walled out and prevented from entering beneath the keys to the mechanism of the machine.

A still further obstruction that prevents the entrance of dust through the keyboard into the machine is found in the transverse frame bar 37 located immediately to the rear of the keys of the first row 29. This bar, as in Fig. 2, extends slightly over the tops of the rear walls of the numeral keys 29. Limited against a bottom shoulder 38 of this transverse frame bar 37 are the tops 21 of the keys of the first row 29. In this construction there is no space existing between the keys and the bar 37, and the entrance of dust at this point through the keyboard is blocked. A tail 41 depends from the transverse frame bar 37 at the rear of the first row of keys 29. The tops of the keys of the first row 29 when depressed do not go below this tail, with the result that no opening for the entrance of dust into the machine is disclosed on depressing such keys.

While I have described what I consider to be a highly desirable embodiment of my invention, it is obvious that changes in form could be made without departing from the spirit of the invention, and I therefore do not limit myself to the exact form herein shown and described, nor to anything less than the whole of my invention as herein set forth and as hereinafter claimed.

What I claim is:

1. In a keyboard, keys, each having an elongated block body, a character and finger well on the top surface of the key, a convexed front wall and a concaved rear wall, the arcs of the front and rear walls having a common radial point, each key body having a slot, a key stem inserted in each slot, each key stem having a hole therethrough, and a plastic bonding material in such slots about such key stems and in the key stem holes for bonding the key stems to the key bodies.

2. In a keyboard, compactly set keys, each having a vertically elongated block body, a finger and character well on the top surface of the key, a convexed front wall and a concaved rear wall, the arcs of the front and rear walls having a common radial point, each key body having a slot, a key stem inserted in each slot, each key stem having a hole therethrough, and plastic bonding material in such slots about such key stems and in the key stem holes for bonding the key stems to the key bodies.

3. In a keyboard, compactly set keys, each having a vertically elongated block body, a finger and character well on the top surface of the key, a convexed front wall and a concaved rear wall, the arcs of the front and rear walls having a common radial point, each key body having a slot, a key stem inserted in each slot, each key stem having a hole therethrough, and plastic bonding material in such slots about such key stems and in the key stem holes for bonding the key stems to the key bodies, and a lever extending rearwardly from each stem and having a pivot point concentric with the radial points of the arcuate walls of the key bodies.

4. The combination in a business machine and the like, of a keyboard comprising compactly set character keys having elongated block bodies, character and finger wells on the top surfaces of such keys, such keys having arcuate front and rear walls in complementary relationship to the walls of the adjacent keys, the arcs of such front and rear walls having a common radial point, each key body having a slot, a key stem inserted in each slot, each key stem having a hole therethrough, and plastic bonding material in such slots about such key stems and in the key stem holes for bonding the key stems to the key bodies, levers extending rearwardly for such key stems, a common pivot for such levers, such pivot being concentric with the radial point of the arcuate key body walls, and framework of the machine about such keys, the walls of such framework being arcuate in complementary relation to the arcuate walls of the keys adjacent to such framework.

5. The combination of a keyboard in a business machine, comprising rows of character keys with block bodies and arcuate front and rear walls, arcuate framework adjoining such keyboard, and a spacing bar intermediate said rows of keys with arcuate front and rear walls, the relationship of the arcuate walls of the several said parts being in close complementary arcuate relationship of the one to the other.

6. For use in a business machine and the like, a character key having a deep block body, arcuate front and rear walls, and a lever for such key, the radial points of such arcuate walls being concentric to the pivot point of the key lever.

7. For use in combination with similar keys in a business machine and the like, a character key having a deep block body, a finger and character well in the top surface of such key, a convexed front and a concaved rear wall having a common radial point, and a lever fast to such key, the pivot point of such lever being concentric with the common radial point of the convexed front and the concaved rear walls.

8. For use in a business machine and the like, the combination of a character key having a deep block body, a finger and character well in the top surface of such a body, a convexed front and a concaved rear wall, the arcs of which walls have a common radial point, said body having a slot extending upwardly into it from its bottom, a lever for such key, an upwardly projecting stem on such lever extending into the body slot, said lever stem having a hole therethrough, plastic bonding material in such slot about such stem and through such hole for securing the said lever fast to the key body, and a pivot for such lever, such pivot being concentric with the common radial point of the convexed front and concaved rear key walls.

9. In a business machine and the like, the combination with keys of similar structure, of a character key having a deep block body, a finger and character well in the top surface of such body, a convexed front and a concaved rear wall, the arcs of which walls have a common radial point, said body having a slot extending upwardly into it from its bottom, a lever for such key, an upwardly projecting stem on such lever extending into the body slot, said lever stem having a hole therethrough, plastic bonding material in such slot about such stem and through such hole for securing the said lever fast to the key body, and a pivot for such lever, such pivot being concentric with the common radial point of the convexed front and concaved rear key walls.

10. In a keyboard of a business machine, ascending rows of keys having arcuate front and rear walls, the arcs of which walls have a common radial point, such keys having vertically elongated block bodies separated from one another by a minimum of space necessary to allow movement of such keys, such bodies being sufficient in depth to allow depression thereof without revealing any opening beneath the immediately adjacent key bodies.

11. In a keyboard of a business machine of the character described, compact ascending rows of character keys having convexed front and concaved rear walls, the arcs of which walls have a common radial point, such keys having vertically elongated block bodies separated from one another by a minimum of space necessary to allow arcuate movement of such keys, such bodies being sufficient in depth to allow depression thereof without revealing any opening beneath the immediately adjacent key bodies, each key body having a slot extending upwardly into it from its bottom, a lever for each of such keys bonded in the slot to the key body, and a pivot for such key levers, such pivot being concentric with the common radial point of the convexed front and concaved rear walls of the key bodies.

12. In a keyboard for a business machine and the like, a plurality of compact ascending rows of keys having convexed front and concaved rear walls, the arcs of which walls have a common radial point, such keys having vertically elongated block bodies separated from one another by a minimum of space necessary to allow arcuate movement of such keys, such key bodies being sufficient in depth to allow depression thereof without revealing any opening beneath the immediately adjacent key bodies, each key body having a slot extending upwardly into it from its bottom, a lever for each key, an upwardly projecting stem on each lever extending into the said key body slot, said lever stem having a hole therethrough, plastic bonding material in such slot about such stem and in such hole for securing the lever stem fast to the key body, pivot means for such key levers concentric with said common radial point, framework of the machine about such keys, such framework being arcuately shaped in complementary relation to the arcuate surfaces of the keys immediately adjacent to such framework, a transverse cross-piece of the framework immediately to the rear of the first row of keys, the bottom edge of such cross-piece overhanging the rear walls of such first row of keys and limited against the tops of such keys, and a tail on such cross-piece depending to the rear of such first row of keys.

13. In a keyboard of a business machine the combination of ascending rows of keys having arcuate front and rear walls, the arcs of which walls have a common radial point, such keys having block bodies in juxtaposition to one another for sliding contact movement of the one in relation to the other, such key bodies being sufficient in depth to allow depression thereof without revealing any opening beneath the immediately adjacent key bodies, each key having a slot extending upwards into its body, a lever for each key, an upwardly projecting stem on each lever extending into the said key body slot, said lever stem having a hole therethrough, plastic bonding material in such slot about such stem and in such hole for securing the lever fast to the key body, pivot means for such key levers concentric with said common radial point, framework of the machine about such keys, such framework being arcuately shaped in complementary relation to the arcuate surfaces of the keys immediately adjacent to such framework, a transverse cross-piece of the framework immediately to the rear of the first row of keys, the bottom edge of such cross-piece overhanging the rear walls of such first row of keys and limited against the tops of such keys, and a tail on such cross-piece depending to the rear of such first row of keys.

14. In a keyboard of a business machine, compactly set rows of keys having arcuate front and rear walls, the arcs of which walls have a common radial point, such keys having block bodies movable in rubbing contact with one another, such bodies being sufficient in depth to allow depression thereof without revealing any opening beneath the immediately adjacent key bodies.

15. To prevent dust from entering through the keyboard of a business machine and the like, compactly set ascending rows of keys having block bodies with arcuate front and rear walls, the front walls being convexed and the rear walls concaved, the arc of such walls having a common radial point, framework of the machine adjacent to such keys with arcuate walls in complementary relationship to the arcuate walls of the adjacent keys, such keys being set in compact relation to one another and to the adjoining framework and being limited in such closeness only to that extent as will allow movement of the keys.

JAN STRENG.

REFERENCES CITED

The following references are of record in the file of this patent:

UNITED STATES PATENTS

| Number | Name | Date |
|---|---|---|
| 726,107 | Stanton | Apr. 21, 1903 |
| 1,468,566 | Hall | Sept. 18, 1923 |
| 1,999,877 | Jennings | Apr. 30, 1935 |
| 2,484,886 | Henry | Oct. 18, 1949 |